United States Patent
Kakoi

(10) Patent No.: US 6,741,370 B1
(45) Date of Patent: May 25, 2004

(54) FACSIMILE TRANSFER SYSTEM

(75) Inventor: Koushiro Kakoi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/210,982

(22) Filed: Dec. 15, 1998

(30) Foreign Application Priority Data

Dec. 16, 1997 (JP) .............................. 9-346062

(51) Int. Cl.$^7$ ................................................ H04N 1/32
(52) U.S. Cl. ....................... 358/468; 358/400; 358/407; 379/100.09
(58) Field of Search ................................ 358/400, 407, 358/442, 468, 438, 1.75, 402, 440; 379/58, 100.09

(56) References Cited

U.S. PATENT DOCUMENTS

| | | | | |
|---|---|---|---|---|
| 5,461,488 A | * | 10/1995 | Witek | 358/402 |
| 5,675,507 A | * | 10/1997 | Bobo, II | 709/206 |
| 5,742,668 A | * | 4/1998 | Pepe | 379/58 |
| 5,796,394 A | * | 8/1998 | Wicks | 345/329 |
| 6,020,980 A | * | 2/2000 | Freeman | 358/402 |
| 6,058,435 A | * | 5/2000 | Sassin et al. | 709/305 |
| 6,067,350 A | * | 5/2000 | Gordon | 379/90.1 |
| 6,157,464 A | * | 5/2000 | Bloomfield | 358/4 |
| 6,157,463 A | * | 12/2000 | Kitagawa | 358/400 |
| 6,370,238 B1 | * | 4/2002 | Sansone | 379/88.23 |

FOREIGN PATENT DOCUMENTS

| | | |
|---|---|---|
| JP | H03-289756 | 12/1991 |
| JP | H04-277954 | 10/1992 |
| JP | H07-23127 | 1/1995 |
| JP | H09-121274 | 5/1997 |

* cited by examiner

*Primary Examiner*—Kimberly Williams
*Assistant Examiner*—Negussie Worku
(74) *Attorney, Agent, or Firm*—Sughrue Mion, PLLC

(57) ABSTRACT

A facsimile data transmitted from a facsimile terminal 2 through a pay station telephone network (PSTN) 1 and received by a private branch exchange 3 is automatically transferred between a voice mail device 5, a facsimile mail device 4, electronic mail devices 8a and 8b, and key telephone sets 6a and 6b. A circuit interface portion 50 of the voice mail device 5 processes the received data. An aural response control portion 51 of the voice mail device 5 reads an aural guidance data of an aural guidance data memory portion 56 and controls a response. A communication transfer control portion 53 performs a control for transferring the data from the facsimile terminal 2 through the circuit interface portion 50 to a facsimile mail device 4, on the basis of a transfer control information which is stored in a memory portion 54. A hard disk device 55 stores a voice mail data from the facsimile terminal 2.

15 Claims, 14 Drawing Sheets

| Character | |
|---|---|
| 1 | Dial 1 |
| 2 | Dial 2 |
| 3 | Dial 3 |
| 4 | Dial 4 |
| 5 | Dial 5 |
| 6 | Dial 6 |
| 7 | Dial 7 |
| 8 | Dial 8 |
| 9 | Dial 9 |
| * | Dial * |
| # | Dial # |
| T | Dial by DTMF |
| P | Dial by DP |
| . | Pause |
| F | Hook Flash |
| Z | On Hook |
| %B | Dial Box Number |

FIG.9

| Mail Box Number | Individual ID Number |
|---|---|
| 100 | 100 |
| 101 | 101 |
| ⋮ | ⋮ |
| 199 | 199 |

221

222

| FAX Transfer Command |
|---|
| HT200PPP＊％B＊＊Z |
| HT200PPP＊％B＊＊Z |
| ⋮ |
| HT200PPP＊％B＊＊Z |

「HT200PPP＊100＊＊Z」

FACSIMILE TRANSFER SYSTEM

CROSS REFERENCE TO RELATED APPLICATIONS

The present invention claims priority from Japanese Patent Application No. 9 346062 filed Dec. 16, 1997, the contents of which are incorporated herein by reference.

BACKGROUND OF THE INVENTION

1. Field of the Invention

The present invention relates to a facsimile transfer system for automatically transferring a facsimile data which is received from a pay station telephone network through a private branch exchange, between a voice mail device, a facsimile mail device and an electronic mail device.

2. Description of Related Art

A private branch exchange system to which a key telephone sets, voice mail devices and facsimile (FAX) devices are connected has been used as a private branch exchange connected to a pay station telephone network (PSTN). Further, in an example of a recent private branch exchange system, an integrated services digital network (ISDN) is connected to a private branch exchange by connecting the private branch exchange to an R point on the output side of a terminal adapter (TA) and an electronic mail system constructed with a local area network (LAN) is connected to the private branch exchange.

A voice mail device connected to this private branch exchange is equipped with a voice mail box corresponding to an individual extension telephone number. For example, when there is a call through the private branch exchange to a key telephone having the extension telephone number and the key telephone does not respond to the call even when the number of ringing exceeds a predetermined number, an aural absence message preliminarily stored in a solid state recording element is sent from the private branch exchange to the calling side and a message of the calling side is recorded in the voice mail box. Alternatively, a call is directly received at a voice mail box number corresponding to an individual extension telephone number and a message of the calling side is recorded by the voice mail box.

Thereafter, the private branch exchange sends a signal indicative of the absence message (the message of the calling side being recorded) to the called key telephone and notices the fact to a user thereof by using a lamp display. Thereafter, the user of the key telephone operates the latter to listen the message of the calling side recorded in the voice mail box of the voice mail device.

In the facsimile device, when a telephone number dedicated to the facsimile device is called, a facsimile message data is received and printed out automatically. A reception of the facsimile call is confirmed by the print output (hard copy) of the facsimile message data. In this case, there is a necessity of confirming facsimile messages (hard copies) received irregularly by a user thereof and the confirmation work is troublesome.

In the electronic mail system, a network is constructed by connecting data communication terminals for transmitting/receiving data of personal computers to a LAN connected to a private branch exchange. The data is received at a node of the LAN or a data communication terminal by using an ISDN address including an ISDN number or sub address.

Further, a FAX/electronic mail transfer system for transferring data between a facsimile device and an electronic mail device by means of a gate way device is constructed recently. In the FAX/electronic mail transfer system, a facsimile message can be transmitted from a transmitter side as a facsimile message or an electronic mail, selectively. In this case, a facsimile message data is transmitted to an individual main box of electronic mail by instructing the individual main box of electronic mail by an operation of a push button (PB), that is, a second dialing by means of DTME tone.

As mentioned, in the prior art techniques, the facsimile message can not be transferred to the voice mail device although the facsimile message can be transmitted to a facsimile device or the electronic mail device. That is, it is impossible to automatically transfer a received facsimile message between data communication terminals in the voice mail system, the facsimile mail system and the electronic mail system.

SUMMARY OF THE INVENTION

An object of the present invention is to provide a facsimile transfer system capable of automatically transferring a facsimile message transmitted from a pay station telephone network and received by the facsimile transfer system through a private branch exchange between a voice mail device, a facsimile mail device and an electronic mail device.

In order to achieve the above object, according to a first aspect of the present invention, a facsimile transfer system comprises a voice mail device and a facsimile mail device which are connected to a private branch exchange connected to a pay station telephone network and an electronic mail device connected to the facsimile mail device, wherein a facsimile message received from the facsimile terminal connected to the pay station telephone network by the private branch exchange is automatically transferred between the voice mail device, the facsimile mail device and the electronic mail device.

In this construction, a key telephone set is further connected to the private branch exchange, wherein, when the message received by the facsimile mail device through the private branch exchange is not a facsimile data, the private branch exchange performs a control for connecting the received message to the key telephone set according to an instruction of the facsimile mail device.

Further, in the facsimile transfer system according to the present invention, the facsimile terminal is constructed such that an individual mail box number data of the voice mail device, which is input from an input operation unit, and a facsimile data read out by a subject copy reader are transmitted to the voice mail device through the pay station telephone network and the private branch exchange under communication controls of a facsimile communication control device and a control portion.

Further, the private branch exchange is constructed with office line circuits connected thereto by circuits, extension circuits connected to the voice mail device and the facsimile mail device, a switch circuit for switching communication lines between the office line circuits and the extension line circuits and the control portion for controlling a communication line connection between the voice mail device and the facsimile mail device through the extension circuits when a transfer information is taken in by the private ranch exchange after a facsimile data is received by the voice mail device.

Further, the facsimile mail device is constructed with a printing portion, an input operation portion, a facsimile data storage portion, a facsimile communication control portion, a connection portion for operating an interface between the facsimile communication control device and the electronic mail device and a control portion for ending a facsimile data received through the private branch exchange to the printing portion, or instructing the private branch exchange of a transfer of received message data which is not a facsimile data and sending the facsimile data transferred from the voice mail device through the private branch exchange to the electronic mail device through the connection portion.

The voice mail device is constructed with a circuit interface portion, an aural response control portion for controlling an aural guidance response, a communication transfer control portion for transferring a message data received from the facsimile terminal, a memory portion for storing a transfer control information to the facsimile mail device, a hard disk device for storing voice mail data and an aural guidance data memory portion.

The electronic mail device comprises a general purpose compact computer including a personal computer, and the key telephone set comprises an input/output interface portion, a telephone circuit for performing at least amplification and side tone processing for a transmission signal and a receiving signal, a microphone and a loud speaker and a key board. Further, a plurality of the electronic mail devices are connected to a local area network connected to the facsimile mail device and a plurality of the electronic mail devices are connected to the local area network connected to the private branch exchange.

Further, the facsimile transfer system of the present invention performs a transfer control of a facsimile data when it detects an individual mail box number data and a call tone signal within a constant time after a call is received. Further, a facsimile transmission procedures are binary transmission control procedures and a transmission procedures of a facsimile data from the facsimile mail device in the local area network are Internet facsimile transmission procedures. Further, the facsimile transfer system comprises a facsimile transfer control data table and a transfer control information stored therein is a DTME data including numerals and symbols used in the push button system.

In the facsimile transfer system of the present invention, the voice mail device reads the aural guidance data in response to the reception of the facsimile data and controls the response. Further, on the basis of the stored transfer control information to the facsimile mail device and the electronic mail device, the facsimile transfer system performs a transfer control of the received facsimile data, as mentioned. As a result, it becomes possible to automatically transfer the facsimile data received from the pay station telephone network through the private branch exchange between the voice mail device, the facsimile mail device and the electronic mail device, so that the convenience of the facsimile transmission is improved.

BRIEF DESCRIPTION OF THE DRAWINGS

The above mentioned and other objects, features and advantages of the present invention will become more apparent by reference to the following detailed description of the invention taken in conjunction with the accompanying drawings, in which:

FIG. 9 is a table for explaining characters/operations used in a transfer control of a facsimile mail data in the first embodiment;

DETAILED DESCRIPTION OF THE PREFERRED EMBODIMENTS

An embodiment of the facsimile transfer system according to the present invention will be described in detail with reference to the drawings.

Figure 1:
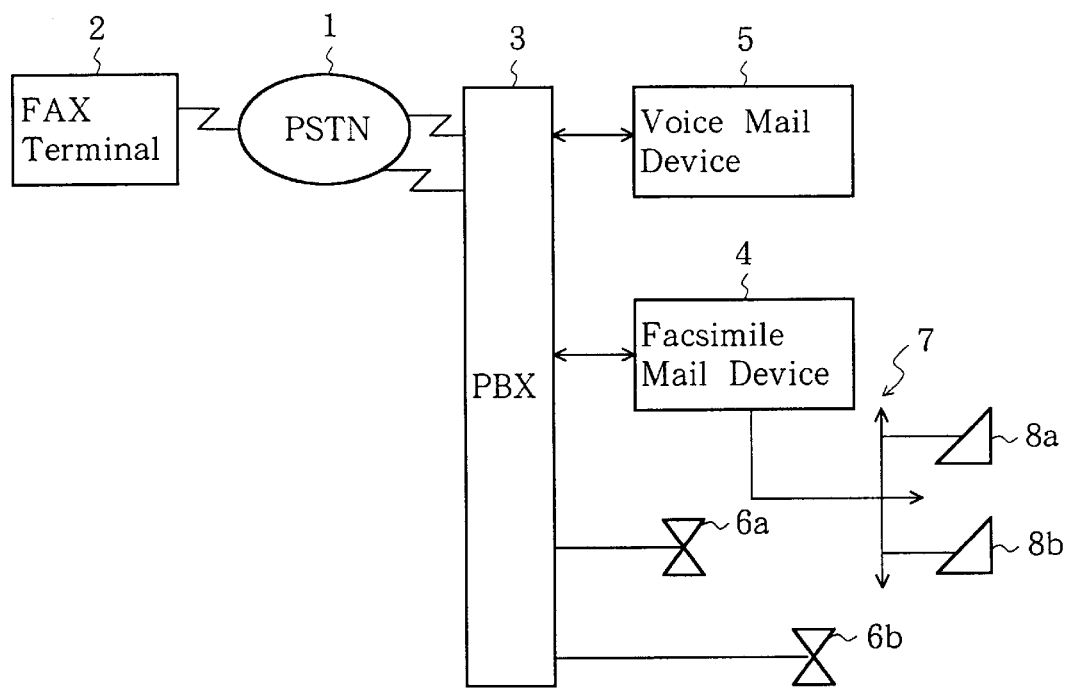
FIG. 1 is a block circuit diagram showing a construction of a facsimile transfer system according to a first embodiment of the present invention.

FIG. 1 is a block circuit diagram of a first embodiment of the facsimile transfer system according to the present invention. The facsimile transfer system shown in FIG. 1 is constructed with a pay station telephone network (PSTN) 1 for performing an analog telephone communication, a facsimile (FAX) terminal 2 for performing a facsimile transmission/receiving of the type G3 through the pay station telephone network 1 on the basis of the binary transmission control procedure (CCIT recommendation T.30), a private branch exchange 3 connected to the pay station telephone network 1, for switching connections of extension line and line wire and a facsimile mail device 4 connected to the private branch exchange 3, for performing a facsimile transmission/receiving and an automatic transfer of the facsimile data to electronic mail devices 8a and 8b. Further, the facsimile transfer system includes a voice mail device 5 connected to the private branch exchange 3 for storing and sending a voice mail, key telephone sets 6a and 6b connected to the private branch exchange 3, for performing communications of an extension line and a line wire, a local area network (LAN) 7 such as Ethernet or FDDI connected to the facsimile mail device 4 and electronic mail communication devices 8a and 8b constituting the local area network 7 and using a general purpose compact computer (personal computer) for performing an electronic mail communication.

Figure 2:
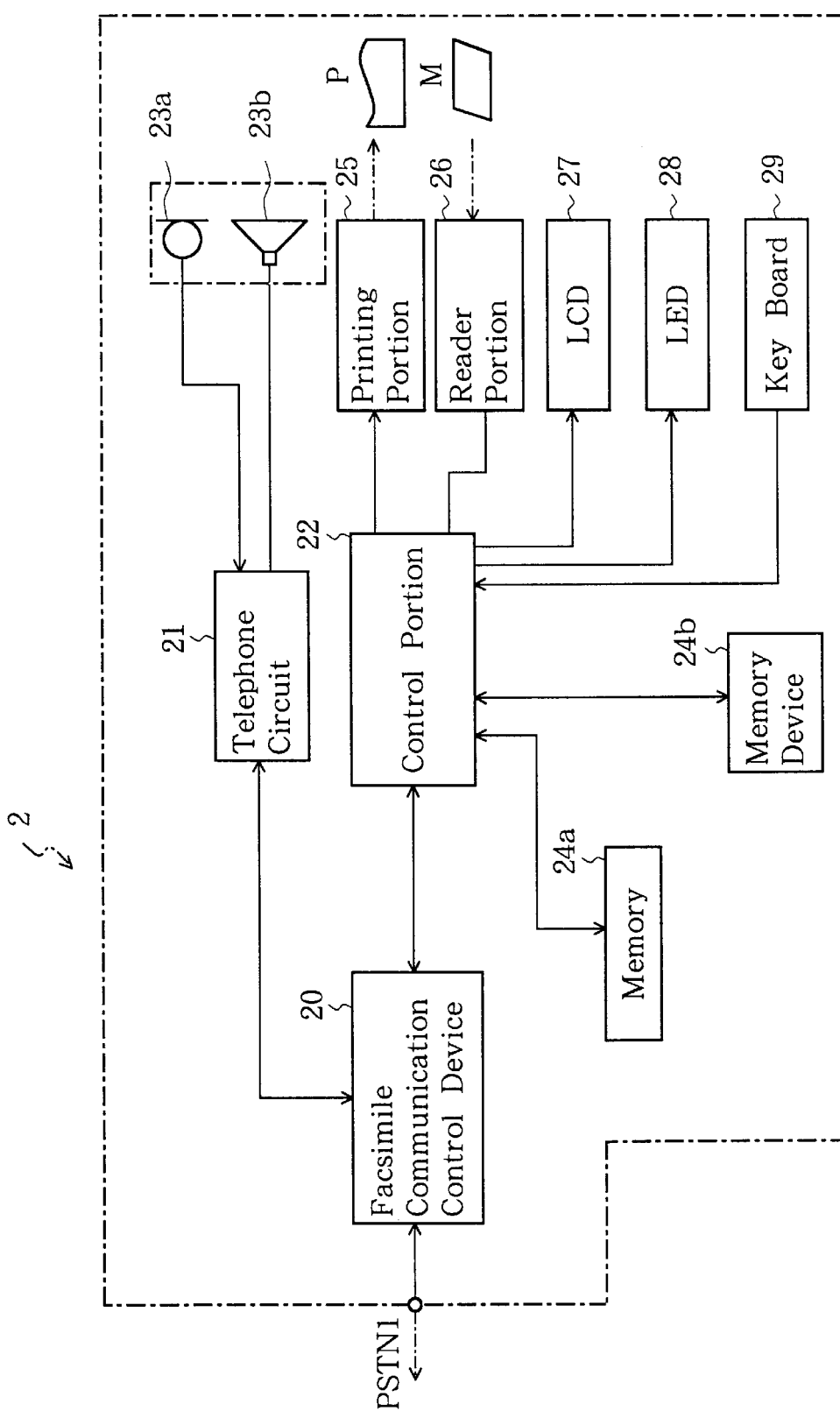
FIG. 2 is a block diagram showing a detailed construction of a facsimile terminal of the facsimile transfer system shown in FIG. 1.

FIG. 2 is a block diagram showing a construction of the facsimile terminal 2 in detail. The facsimile terminal 2 includes a facsimile communication control device 20 for performing a facsimile transmission/receiving control with respect to the pay station telephone network 1 according to the binary transmission control sequence, a telephone circuit 21 for amplifying a transmitting signal and a receiving signal and processing side tone thereof, a control portion 22 for controlling operations of the respective components, and a microphone 23a and a loud speaker 23b which constitute a hand set. The facsimile terminal 2 further includes a working memory 24a, a memory device 24b for storing the received facsimile data, a printing portion 25 for providing a print sheet P on which the received facsimile data is printed, a reader portion 26 for reading out a subject copy M to be transmitted, a liquid crystal display (LCD) 27 for displaying, on a screen thereof, a content of signal processing related to the facsimile transmission and receiving, a light emitting diode (LED) 28 for displaying the processing content related to the facsimile transmission and receiving and a key board 29 for performing various input operation.

Figure 3:
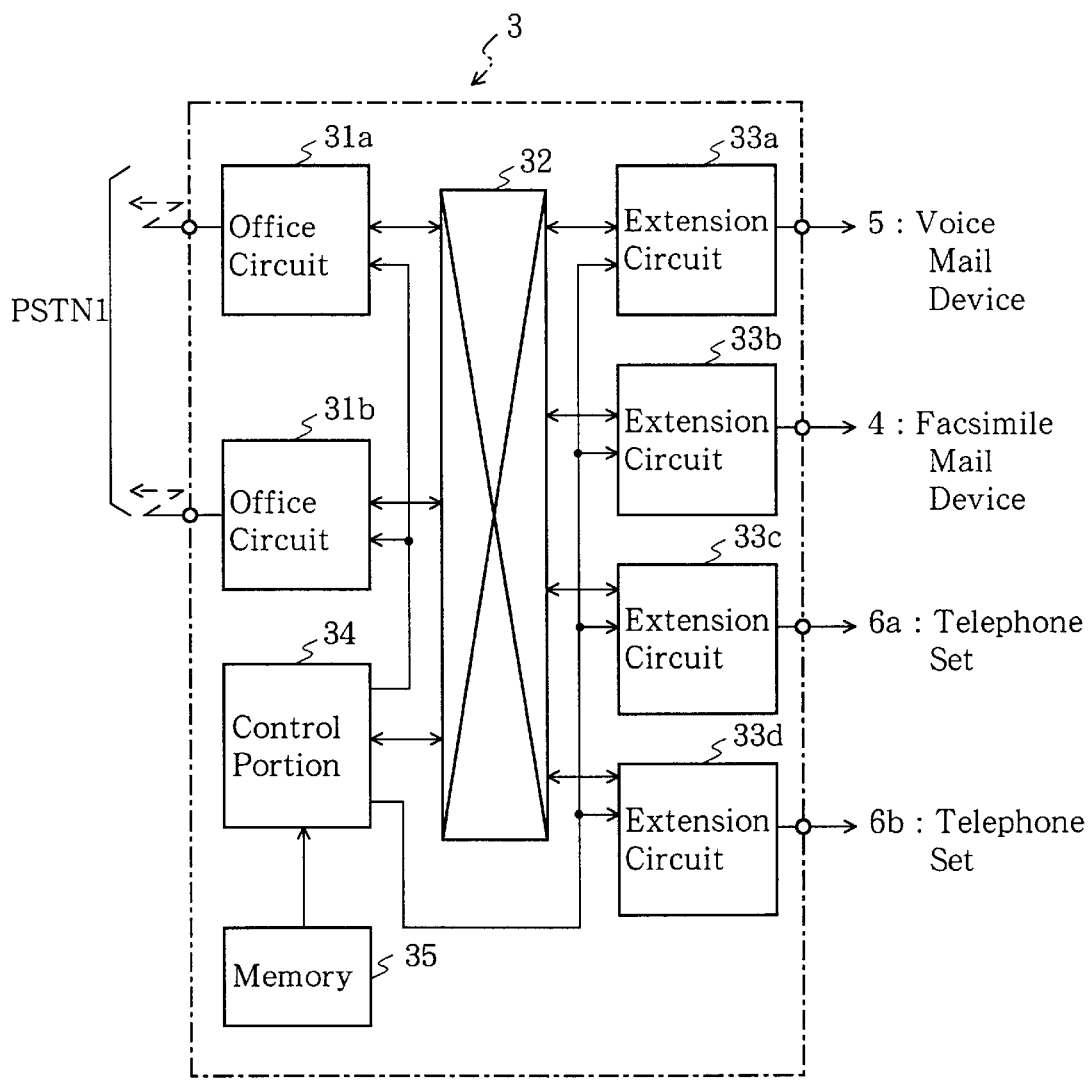
FIG. 3 is a block diagram showing a detailed construction of a private branch exchange of the facsimile transfer system shown in FIG. 1.

FIG. 3 is a block diagram showing a detail of the private branch exchange 3 shown in FIG. 1. The private branch exchange 3 includes office circuits 31a and 31b for receiving signals from the pay station telephone network 1 and capturing, connecting and opening telephone lines therefor, a switch circuit 32 for switching the communication paths between extension circuits and the line wire and extension circuits 33a, 33b, 33c and 33d connected to the key telephone sets 6a and 6b, the facsimile mail device 4 and the voice mail device 5 for processing signals thereof. The private branch exchange 3 further includes a control portion 34 for controlling operation of the respective portions and a memory 35 for storing control programs, etc.

Figure 4:
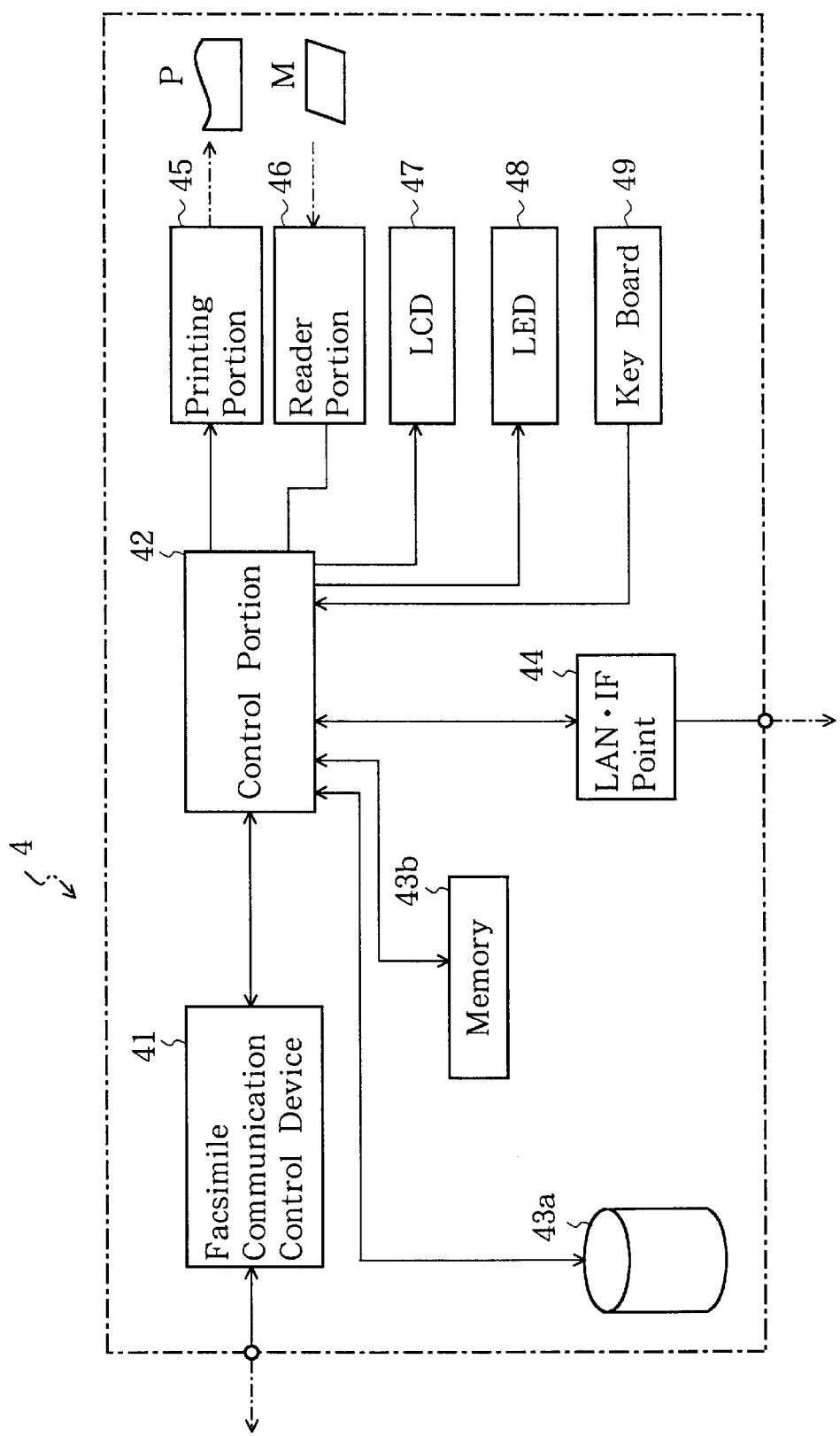
FIG. 4 is a block diagram showing a detailed construction of a facsimile mail device of the facsimile transfer system shown in FIG. 1.

FIG. 4 is a block diagram showing a detailed construction of the facsimile mail device 4 shown in FIG. 1. The facsimile mail device 4 includes a facsimile communication control device 41, a control portion 42, a memory 43b, a printing portion 45, a reader portion 46, a liquid crystal display 47, a light emitting diode 48 and a key board 49 which are similar to those of the facsimile terminal 2. The facsimile mail device 4 further includes a hard disk device 43a for storing a received facsimile data and a local area network interface (I/F) 44 for interfacing between the facsimile mail device 4 and the local area network 7.

Figure 5:
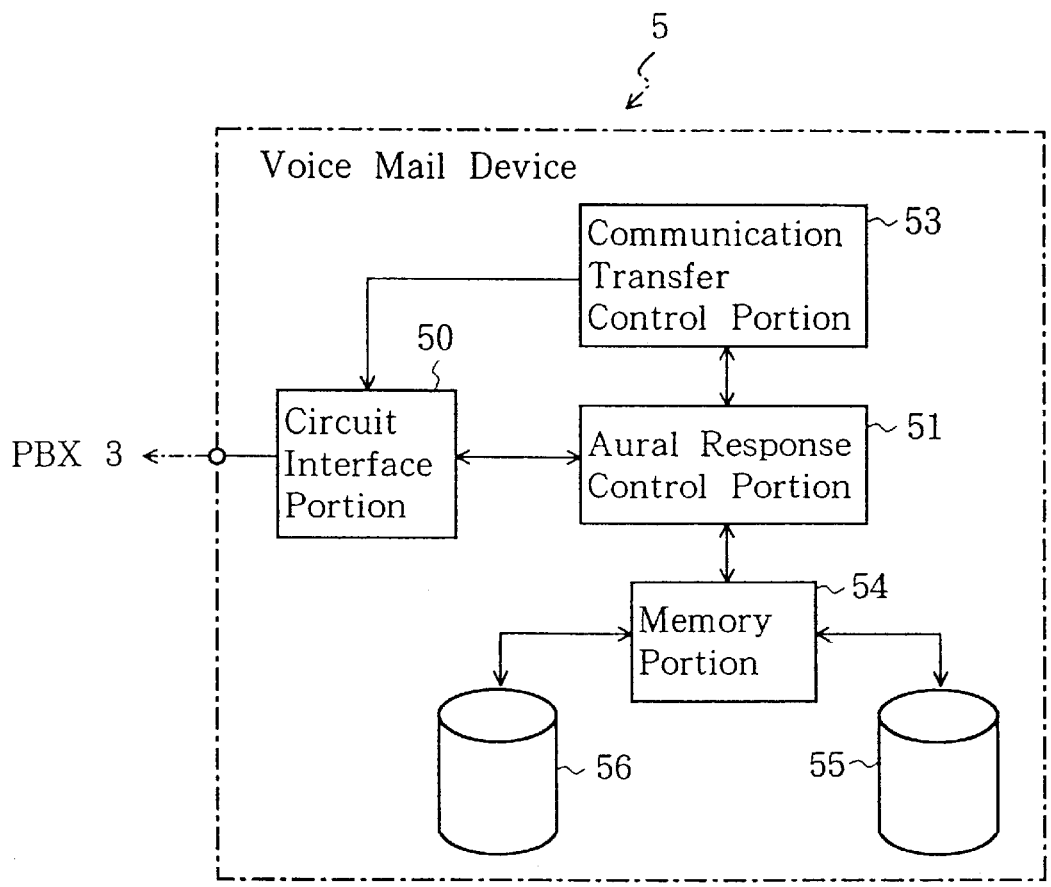
FIG. 5 is a block diagram showing a detailed construction of a voice mail device of the facsimile transfer system shown in FIG. 1.

FIG. 5 is a block diagram showing a detailed construction of the voice mail device 5 shown in FIG. 1. The voice mail device 5 includes a circuit interface portion 50 for interfacing an input/output signal between the private branch exchange 3 and the voice mail device 5, an aural response control portion 51 for controlling an aural guidance response, a communication transfer control portion 53 for controlling a transfer of a signal from the facsimile terminal, a memory portion 54 for storing a transfer control information with respect to the facsimile mail device 4 and a facsimile transfer control data table, a hard disk device 55 for storing a voice mail data and an aural guidance data memory portion 56 for preliminarily storing the aural guidance data.

Figure 6:
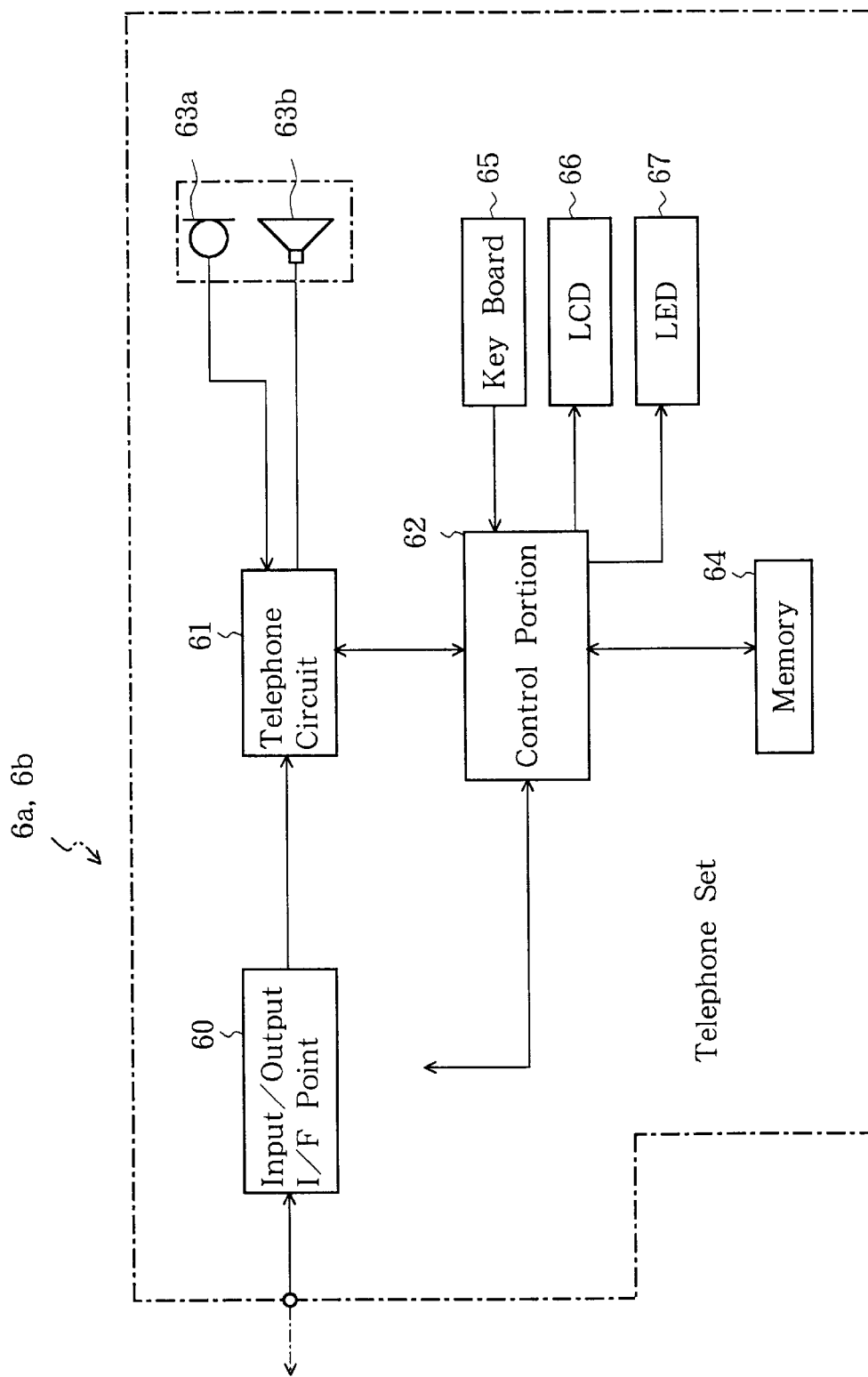
FIG. 6 is a block diagram showing a detailed construction of a key telephone set of the facsimile transfer system shown in FIG. 1.

FIG. 6 is a block diagram showings a detailed construction of the key telephone set 6a (6b) shown in FIG. 1. The key telephone set 6a (6b) includes a telephone circuit 61, a control portion 62, a microphone 63a, a loud speaker 63b, a memory 64, a key board 65, a light emitting diode (67) and a liquid crystal-display (66) which are similar to those of the facsimile terminal 2 shown in FIG. 2. The key telephone set 6a (6b) further includes an input/output interface portion 60 for interfacing a calling, a call received, transmission of a dial (selection) signal and various input/outputs between the key telephone set and the private branch exchange 3.

An operation of the first embodiment shown in FIG. 1 will be described with reference to FIG. 7 which shows a flowchart of the processing procedures of the voice mail device 5.

Figure 7:
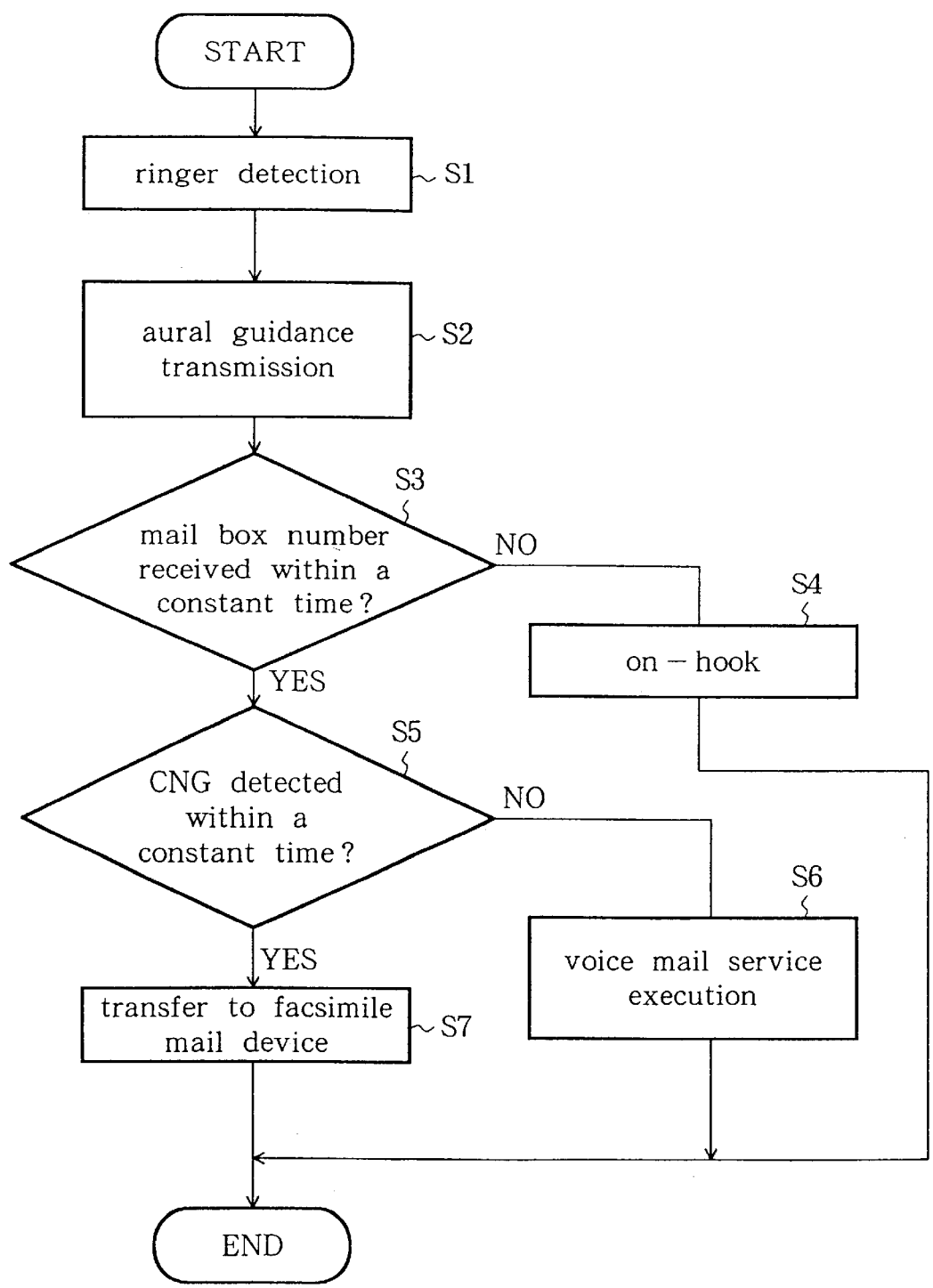
FIG. 7 is a flowchart showing a processing performed in the voice mail device according to the first embodiment.

In FIGS. 1 and 7, the facsimile terminal 2 calls the voice mail device 5 through the pay station telephone network 1 and the private branch exchange 3. In response to a call signal, that is, a ringer, the voice mail device 5 is on-hooked, that is, actuated, and transmits an aural guidance related to a voice mail reception to the calling side (Steps S1 and S2). Then, the voice mail device 5 determines whether or not a mail box number information assigned by the facsimile terminal 2 is received (Step S3). If the voice mail device 5 does not receive the mail box number information (S3: No), the voice mail device 5 is on hooked (S4) and the operation ends. If the mail box number information is received by the voice mail device 5 (S3: Yes), the voice mail device 5 determines whether or not a call tone CNG is received within a constant time (Step S5). If the call tone CNG is not received within the constant time (No), the voice mail device 5 executes a voice mail service (Step S6).

When the call tone CNG is received within the constant time (S5: Yes), the voice mail device transfers the received facsimile data to the facsimile mail device 4 (S7) and a printed sheet P is output from the facsimile mail device. When the voice mail device 5 recognizes that the calling side is not the facsimile terminal 2, the voice mail device 5 instructs the private branch exchange 3 of a transfer of the received call to one of the key telephone sets 6a and 6b which corresponds to the mail box number. The private branch exchange 3 calls one of the key telephone sets 6a and 6b to which the received call is transferred and performs a connection to the calling side.

Figure 8:
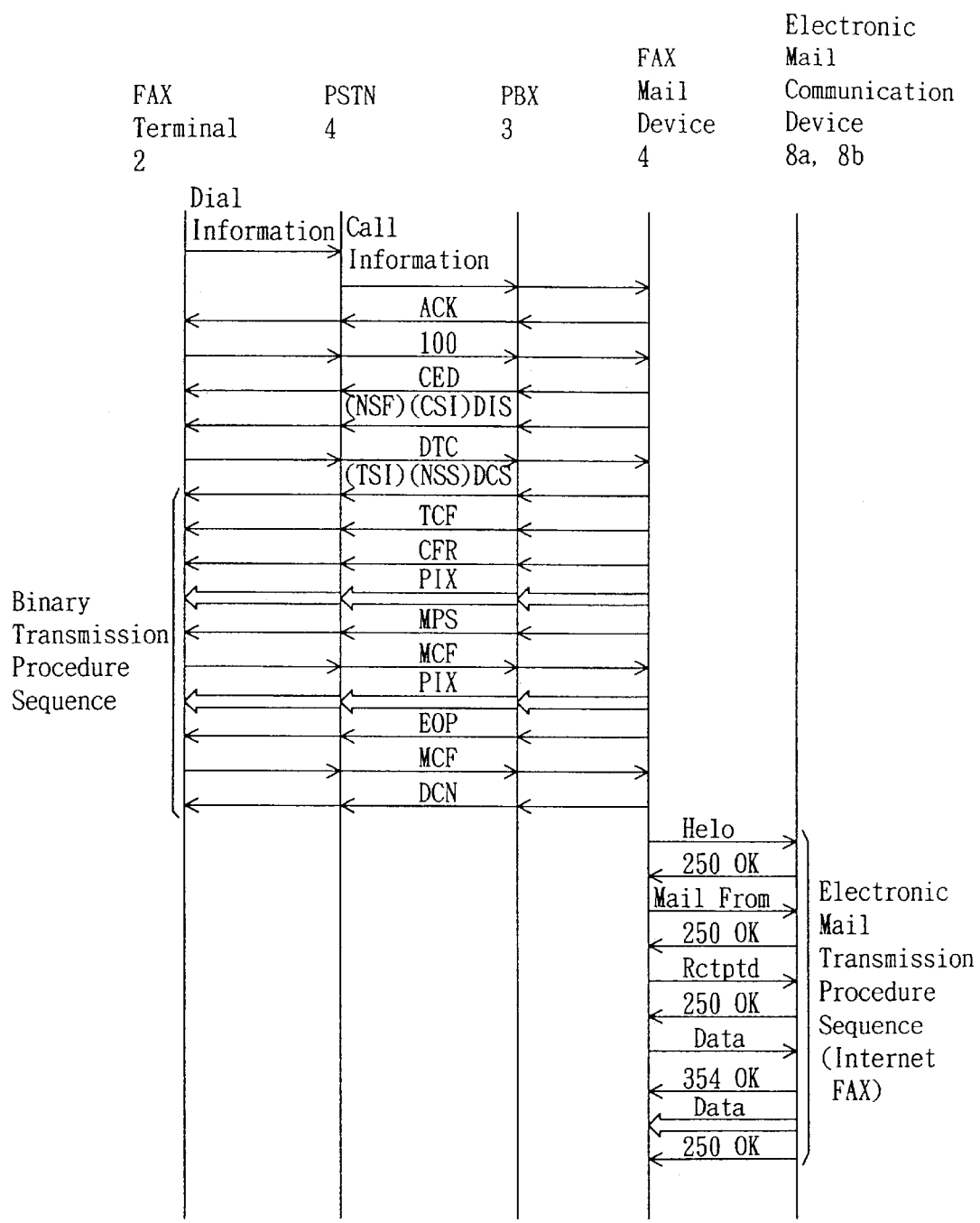
FIG. 8 shows a sequence of the operation of the first embodiment.

Now, an operation of the facsimile transfer system in a case where there is a direct call from the facsimile terminal 2 to the facsimile mail device 4 will be described with reference to FIG. 8 which is a sequence diagram showing a signal processing between the facsimile terminal 2, the facsimile mail device 4 and the electronic mail communication devices 8a and 8b.

In this sequence, the facsimile terminal 2 calls the pay station telephone network 1 and, thereafter, a call information is sent from the pay station telephone network 1 through the private branch exchange 3 to the facsimile mail device 4.

The facsimile mail device 4 sends a acknowledge response (ACK) through the private branch exchange 3 and the pay station telephone network 1 to the facsimile terminal 2. An individual identification number (in this case, 100) is sent from the facsimile terminal 2 to a destination corresponding to one of the electronic mail communication devices 8a and 8b in the local area network 7 and, then, a called side identification signal CED is sent from the facsimile mail device 4 through the private branch exchange 3 and the pay station telephone network 1 to the facsimile terminal 2.

Thereafter, the facsimile transmission/receiving of the G3 system is performed according to the binary transmission control procedures (CCIT recommendation T.30). That is, a transmission/receiving of a non standard device signal NSF, a called side identification signal CSI, a digital identification signal DIS, a digital transmission confirmation signal DTC, a digital command signal DCS, a transmitting station identification signal TSI, a non-standard device interpretation signal NSS, a training check confirmation signal TCF, a confirmation of receiving signal CFR, a facsimile storing picture information PIX, a multi page signal MPS, a message-confirmation signal MCF, a facsimile storing picture information PIX, an end-of-procedure signal EOP and a circuit disconnection instruction signal DCN is performed. In this case, the facsimile mail device 4 stores the facsimile data.

Then, after the receiving of the facsimile data by the facsimile mail device 4 is completed, the facsimile data is transferred from the facsimile mail device 4 to one of the electronic mail communication devices 8a and 8b corresponding to the destination individual identification number (100). As shown in FIG. 8, the Internet facsimile transmission procedures are executed between the facsimile mail device 4 and the electronic mail devices 8a and 8b. First, the facsimile mail device 4 sends a HELO command to the electronic mail devices 8a and 8b and the electronic mail devices 8a and 8b send a 250 OK command to the facsimile mail device 4. Then, commands MAIL FROM, 250 OK, RCTPTD, 250 OK, DATA and 354 OK are exchanged between the facsimile mail device 4 and the electronic mail devices 8a and 8b and DATA (facsimile data) stored in the facsimile mail device 4 is sent to the electronic mail devices 8a and 8b. The transfer sequence is ended by a transmission of the 250 OK command from the electronic mail devices 8a and 8b to the facsimile mail device 4.

Figure 10:
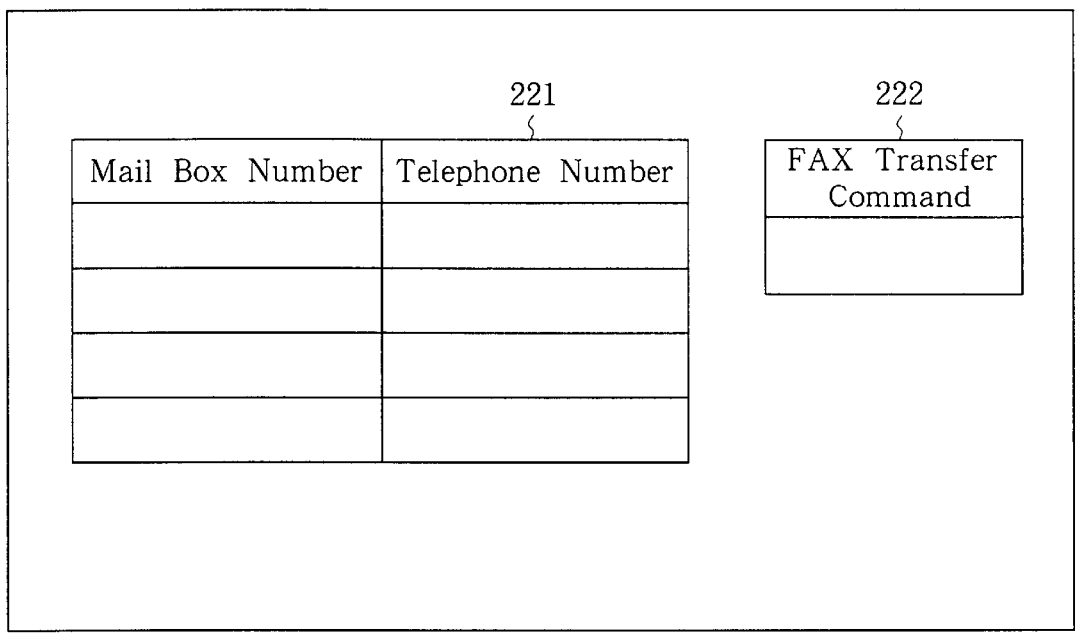
FIG. 10 is a facsimile transfer control data table in a memory portion of the voice mail device shown in FIG. 5.
Figure 11:
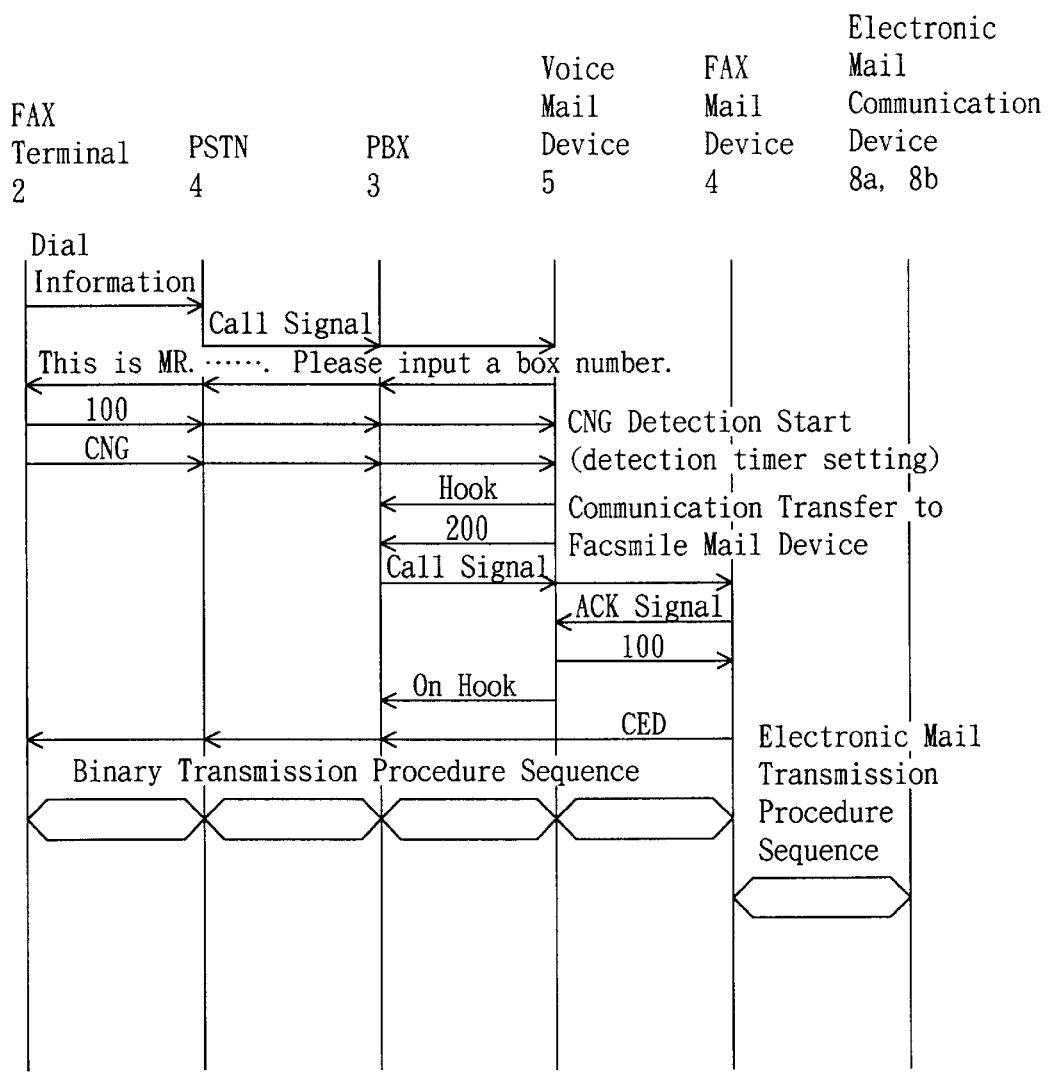
FIG. 11 is a sequence diagram of a detailed operation of the first embodiment.
Figures 12, 13:
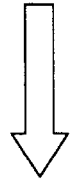
FIG. 12 shows a memory content of a mail box number/individual identification number portion in the facsimile transfer control data table shown in FIG. 10.
FIG. 13 shows an example of a memory content of a FAX transfer instruction portion in the facsimile transfer control data table in FIG. 10.

Now, an operation of the system in a case where the facsimile terminal 2 calls the voice mail device 5 will be described in detail with reference to FIGS. 9 to 13, in which FIG. 9 is a table for explaining characters/operations used in a transfer control of a facsimile mail data, FIG. 10 is a facsimile transfer control data table in a memory portion 54 of the voice mail device 5 shown in FIG. 5, FIG. 11 is a sequence diagram of a detailed operation in the case where the facsimile terminal 2 calls the voice mail device 5 and FIGS. 12 and 13 show examples of the memory contents of the facsimile transfer control data table.

A transfer control information to the facsimile mail device 4 shown in FIG. 9 is preliminarily stored in the memory portion 54 of the voice mail device 5 shown in FIG. 5. In FIG. 9, numerals 1 to 9 mean transmission of dial numbers 1 to 9, respectively, symbols * and # mean transmission of * and # dial data, respectively, and capital letters T and P mean transmission of DTMF data and DP data, respectively. Further, *, F, Z and %b mean transmission of dial data of pause, hook flash, on hook and mail box number, respectively. The facsimile transfer control data table shown in FIG. 10 is stored in the memory portion 54 of the voice mail device 5 shown in FIG. 5 and includes a mail box number/ individual identification number portion 221 and a FAX transfer command portion 222.

In FIGS. 1 to 6 and 9 to 13, the facsimile terminal 2 calls the pay station telephone network 1 and sends the dial information thereto. A ringer signal is sent from the pay station telephone network 1 through the private branch exchange 3 to the voice mail device 5. The voice mail device 5 is activated by this ringer and sends an aural guidance "This is Mr.__. Please input the mail box number." through the private branch exchange 3 and the pay station telephone network 1 to the facsimile terminal 2.

The facsimile terminal 2 performs these and subsequent operations by the operations of the components thereof shown in FIG. 2. That is, the facsimile terminal 2 performs the facsimile transmission/receiving control according to the binary transmission control procedure between the facsimile communication control device 20 and the pay station telephone network 1 by means of the memory 24a under control of the control portion 22, and the telephone circuit 21 performs an amplification and a side tone processing for a transmitting signal from the microphone 23a and a receiving signal of the loud speaker 23b.

Further, the memory device 24b of the facsimile terminal 2 stores the received facsimile data during the facsimile transmission/receiving and the printing portion 25 outputs the printed sheet P on which the received facsimile data is printed. Further, the reader portion 26 reads out the subject copy M to be transmitted, the liquid crystal display 27 displays the processing related to the facsimile transmission/ receiving on the screen and the light emitting diode 28 indicates the processing. The telephone communication and the facsimile transmission/receiving are performed according to the operation of the key board 29.

Further, the private branch exchange 3 performs these and subsequent operations by the operations of the components thereof shown in FIG. 3. That is, the control portion 34 controls the respective components of the private branch exchange 3 on the basis of the control programs stored in the memory 35, the local line circuits 31a and 31b capture, connect and open a circuit with respect to the pay station telephone network 1 and the switch circuit 32 performs a control for switching a communication line between the extension lines and the line wires. Further, the extension circuits 33a to 33d perform the signal processing between the key telephone sets 6a and 6b, the facsimile mail device 4 and the voice mail device 5 under control of the control portion 34.

The facsimile mail device 4 performs these and subsequent operations by the operations of the components thereof shown in FIG. 4. That is, the facsimile communication control device 41, the control portion 42, the memory 43a, the printing portion 45, the reader portion 46, the liquid crystal display 47, the light emitting diode 48 and the key board 49 operate in the same manners as those of the facsimile terminal 2, basically. Further, the hard disk device 43a stores the received facsimile data and the LAN IF portion 44 interfaces between the local area network 7 and the facsimile mail device 4.

On the side of the facsimile terminal 2, the mail box number is input according to the aural guidance. For example, the destination individual identification number (100) which is one of the electronic mail communication devices 8a and 8b in the local area network 7 is sent from the facsimile terminal 2 through the pay station telephone network 1 and the private branch exchange 1 to the voice mail device 5. When the voice mail device 5 does not receive the mail box number information assigned by the facsimile terminal 2, the on-hook processing is performed.

The voice mail device 5 performs these and subsequent operations by operations of the components thereof shown in FIG. 5. That is, when the circuit interface portion 50 detects a call signal from the pay station telephone network 1 through the private branch exchange 3, the circuit interface portion 50 notifies the aural response control portion 51 of the detection of the call signal. The aural response control portion 51 controls the on-hook setting of the circuit interface portion 50 corresponding to the detection of the call signal. Further, the aural response control portion 51 reads the aural guidance data out from the aural guidance memory portion 56 and sends it from the circuit interface portion 50 through the private branch exchange 3 and the pay station telephone network 1 to the facsimile terminal 2.

With this operation, the voice mail device 5 operates as follow. That is, the circuit interface portion 50 takes the call tone CNG in from the facsimile terminal 2 and sends it to the aural response control portion 51. The aural response control portion 51 references the facsimile transfer control data table (the mail box number/individual identification number portion 221 and the FAX transfer command portion 222 shown in FIG. 10) and transfers the facsimile transfer control information to the communication transfer control portion 53. Further, the hard disk device 55 stores the voice mail data.

In order to detect a time period up to a reception of a next call tone CNG sent from the facsimile terminal 2, the voice mail device 5 sets a detection timer. When it receives the mail box number and can not receive the call tone CNG within a constant time of the measuring time of the detection timer, the voice mail device 5 executes the voice mail service. Further, when the voice mail device 5 recognizes that the calling side is not the facsimile terminal 2, the voice mail device 4 instructs the private branch exchange 3 to transfer the calling to one of the key telephone sets 6a and 6b, which corresponds to the mail box number. In response to this instruction, the private branch exchange 3 calls the one of the key telephone sets and connects it to the calling side.

Each of the key telephone sets 6a and 6b performs these and subsequent operations by operations of the components thereof shown in FIG. 6. That is, a telephone circuit 61, a control portion 62, a microphone 63a, a loud speaker 63b, a memory 64, a key board 65, a light emitting diode 66 and a liquid crystal display 67 operate similarly to the telephone system of the facsimile terminal 2 through an input/output processing between an input/output interface portion 60 and the private branch exchange 3.

When the voice mail device 5 receives the calling tone CNG from the facsimile terminal 2 within a constant time measured by the detection timer, the voice mail device 5 sends an extension telephone number (assumed as 200) to the private branch exchange 3 after a hook flash and the private branch exchange 3 sends a call signal to the facsimile mail device 4. In response to the call signal, the facsimile mail device 4 sends a response (ACK) to the call signal. The voice mail device 5 sends the information of the individual identification number (100) of the destination corresponding to one of the electronic mail communication devices 8a and 8b in the local area network 7 to the facsimile mail device 4.

The aural response control portion 51 references the facsimile transfer control data table (the mail box number/telephone number portion 221 and the FAX transfer command portion 222 shown in FIG. 10) of the memory portion 54. The aural response control portion 51 takes in the facsimile transfer command data stored in the mail box number/telephone number portion 221 and the FAX transfer command portion 222, from which the facsimile transfer control data is transferred to the communication transfer control portion 53.

The data of the individual identification number (100) and the extension telephone number (200) sent from the voice mail device 5 are stored in the facsimile transfer control data table of the memory portion 54, that is, the mail box number/individual identification number portion 221 and the FAX transfer command portion 222 shown in FIGS. 12 and 13. In the mail box number/individual identification number portion 221 and the FAX transfer command portion 222 of the facsimile transfer control data table, individual identification numbers 100, 101, _, 199 are stored correspondingly to respective mail box numbers 100, 101, _, 199.

Therefore, the facsimile transfer command data stored in the FAX transfer command portion 222 becomes "HT200PPP*%b**Z" on the basis of the character/operation used in the facsimile data transfer control shown in FIG. 9. Thus, "HT200PPP*%b**Z" is read out from the memory portion 54 by the aural response control portion 51.

In the aural response control portion 51, the mail box number %b is replaced by the mail box number in the mail box number/individual identification number portion 221 shown in FIG. 12. Since the mail box number is assigned by the facsimile terminal 2 as "100" as shown in FIG. 11, the facsimile transfer control data sent from the aural response control portion 51 to the communication transfer control portion 53 becomes "HT200PPP*100**Z".

Thereafter, the voice mail device 5 is on-hooked to the private branch exchange 3 and the facsimile mail device is connected to the facsimile terminal 2 through the private branch exchange 3. A called station identification signal CED is sent from the facsimile mail device 4 to the facsimile terminal 2 through the private branch exchange 3 and the pay station telephone network 1.

Thereafter, the facsimile transmission/receiving of the G3 system is performed on the basis of the binary transmission control procedures (CCIT recommendation T.30). That is, together with the non-standard device signal NSF, the called station identification signal CSI and the digital identification signal DIS, the digital transmission command signal DTC, the digital command signal DCS, the transmitting station identification signal TSI, the nonstandard device interpreting signal NSS, the training check signal TCF, the receiving ready confirmation signal CFR, the facsimile stored picture information PIX, the multi page signal MPS, the message confirmation signal MCF, the facsimile stored picture information PIX, the end-of-procedure signal EOP and the circuit disconnection command signal DCN are transmitted/received, as shown in FIG. 8.

In this case, the facsimile mail device 4 stores the facsimile data and the facsimile data is printed therein. Further, the facsimile data is transferred from the facsimile mail device 4 to one of the electronic mail communication devices 8a and 8b, which corresponds to the destination individual identification number (100). As shown in FIG. 8, the Internet facsimile transmission procedures are executed between the facsimile mail device 4 and the selected one of the electronic mail devices 8a and 8b.

That is, by exchanging the commands HELO, 250 OK, MAIL FROM, 250 OK, RCTPTD, 250 OK, DATA and 354 OK, the facsimile data (DATA) stored in the facsimile mail device 4 is sent from the facsimile mail device 4 to one of the electronic mail devices 8a and 8b and the transfer operation is ended by transmitting the 250 OK command from the one electronic mail device to the facsimile mail device 4.

Figure 14:
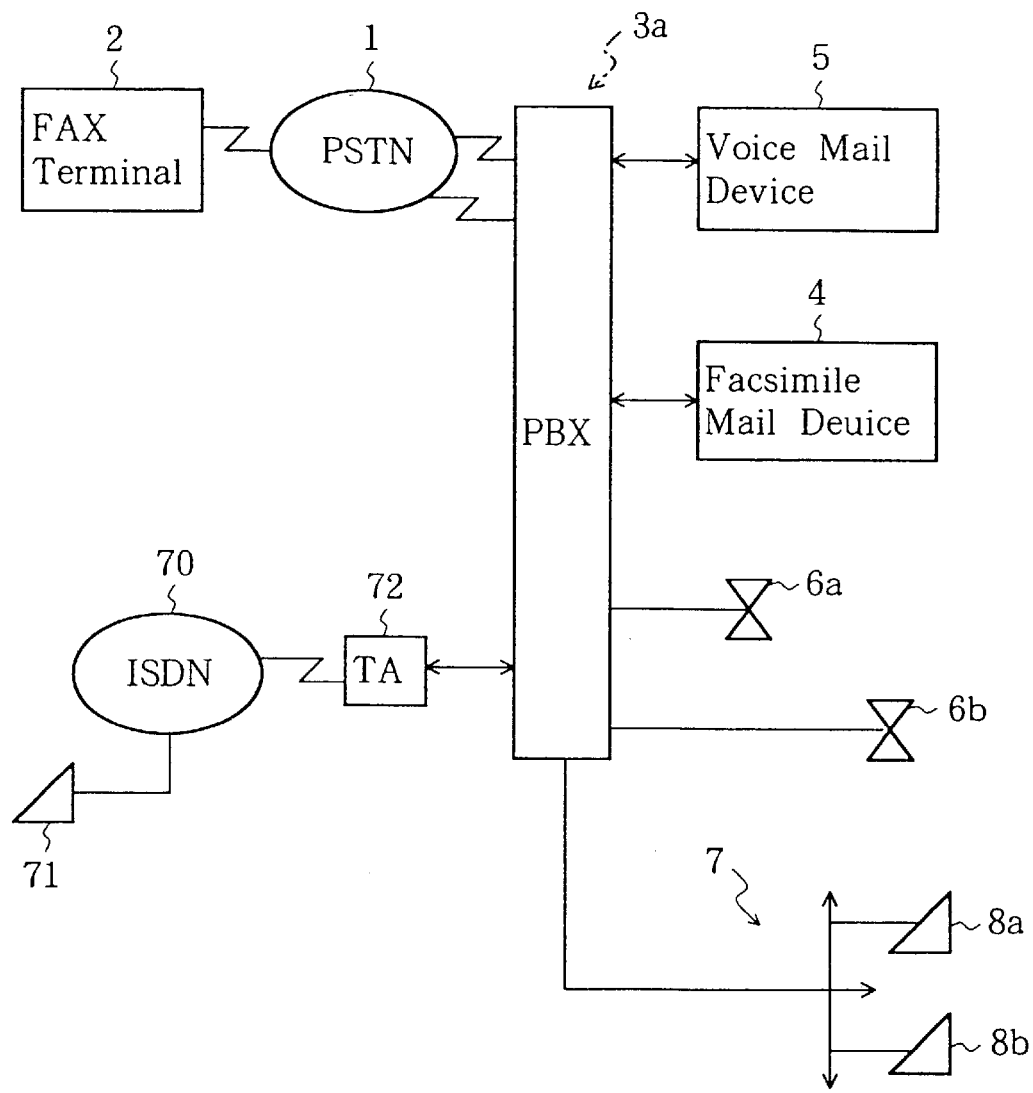
FIG. 14 is a block diagram showing a construction of a second embodiment of the present invention.

FIG. 14 is a block diagram showing a second embodiment of the present invention. In the second embodiment of the present invention, a private branch exchange 3a is connected to an output side (point R) of a terminal adapter (TA) 72 which is connected to an ISDN 70 to which a data terminal device 71 is connected. Further, the private branch exchange 3a is connected to a local area network 7a. Other construction of the second embodiment is the same as that of the first embodiment shown in FIG. 1. That is, a pay station telephone network 1, a facsimile terminal 2, a facsimile mail device 4, a voice mail device 5, key telephone sets 6a and 6b and electronic mail communication devices 8a and 8b are included in the second embodiment.

Figure 15:
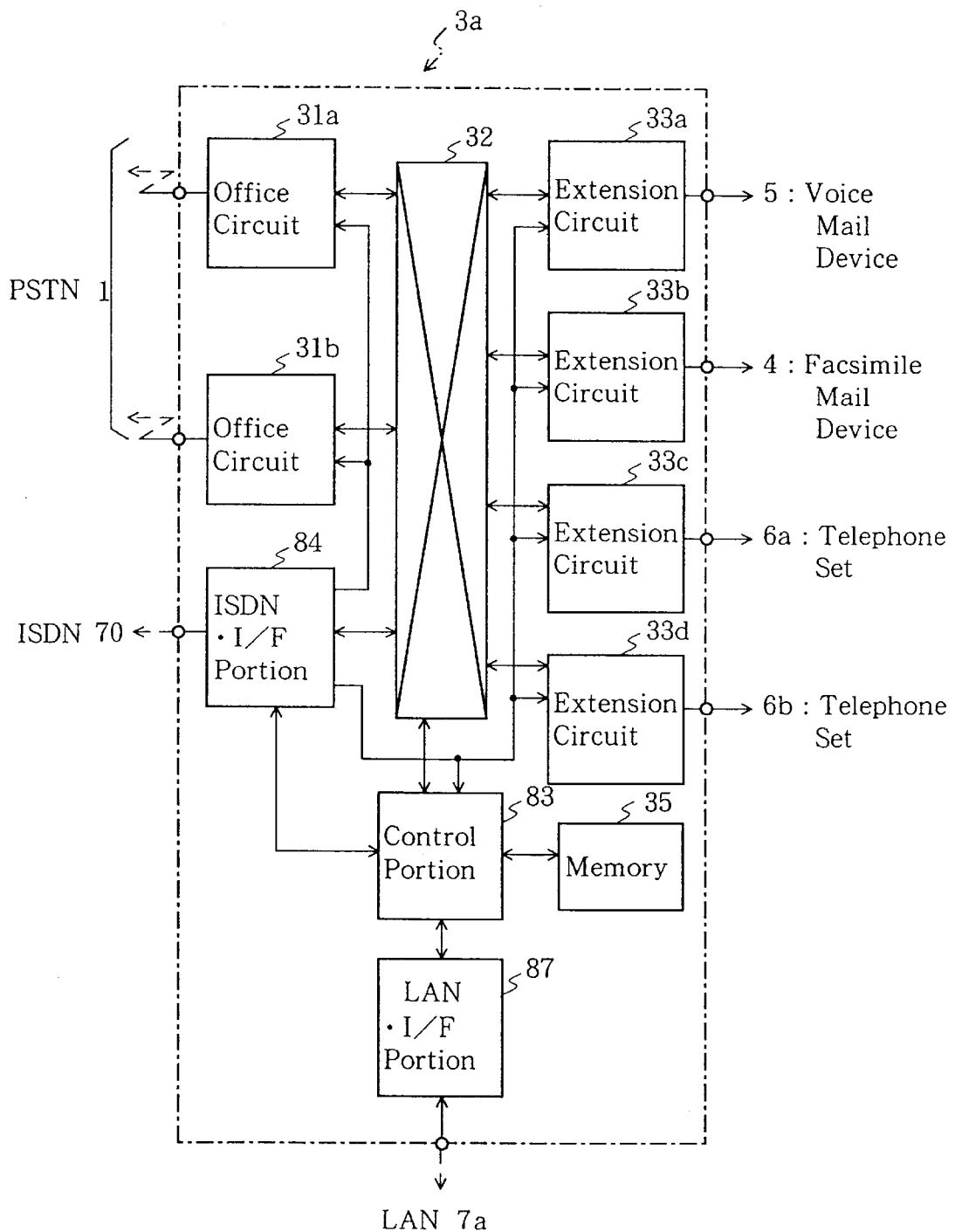
FIG. 15 is a block diagram showing a detailed construction of the private branch exchange shown in FIG. 13.

FIG. 15 is a block diagram showing a construction of the private branch exchange 3a in detail.

The private branch exchange 3a includes office circuits 31a and 31b, a switch circuit 32, extension circuits 33a, 33b, 33c and 33d and a memory 35, similarly to the private branch exchange 3 of the first embodiment. Further, the private branch exchange 3a includes an ISDN interface portion 84 for interfacing between the ISDN 70 and the private branch exchange 3a, a control portion 83 for controlling operations of various components and a LAN I/F portion 87 for interfacing between the local area network 7a and the private branch exchange 3a.

Now, an operation of the second embodiment will be described.

A basic operation of the second embodiment is the same as that of the first embodiment. In the second embodiment, however, the private branch exchange 3a is connected to the ISDN 70 through the terminal adapter 72 and the electronic mail communication devices 8a and 8b perform transmission/receiving electronic mails through the local area network 7a and the ISDN interface portion 84, the control portion 83 and the LAN I/F portion 87 of the private branch exchange 3a. A transfer of mail from the voice mail device 5 to the facsimile mail device 4 is performed through the extension circuits 33a and 33b, the switch circuit 32 and the control portion 83 of the private branch exchange 3a.

As will be clear from the foregoing description, according to the facsimile transfer system of the present invention, the voice mail device performs the transfer control of the received facsimile data a received facsimile data to the facsimile mail device and the electronic mail device on the basis of the stored transfer control information to the facsimile mail device and the electronic mail device. Therefore, it becomes possible to automatically transfer the facsimile data received from the pay station telephone network through the private branch exchange between the voice mail device, the facsimile mail device and the electronic mail device, so that the convenience of the facsimile transmission is improved.

What is claimed is:

1. A facsimile transfer system comprising a private branch exchange connected to a pay station telephone network, a voice mail device connected to said private branch exchange and a facsimile mail device connected to said private branch exchange and an electronic mail device, wherein a facsimile data transmitted from a facsimile terminal connected to said pay station telephone network and received by said private branch exchange is automatically transferred between said voice mail device, said facsimile mail device and said electronic mail device, wherein a plurality of said electronic mail devices are connected to a local area network connected to said facsimile mail device, wherein a mail box number assigning an individual mail box is instructed from said facsimile terminal connected to said pay station telephone network, and wherein a facsimile data received through said facsimile mail device is transferred to said electronic mail device on said local area network on the basis of the information stored in the instructed mail box number.

2. A facsimile transfer system as claimed in claim 1, further comprising key telephone sets connected to said private branch exchange, wherein, when a data received by said facsimile mail device though said private branch exchange is not a facsimile data, a control for connecting the received data to said key telephone set is performed by said private branch exchange according to a command of said facsimile mail device.

3. A facsimile transfer system as claimed in claim 2, wherein said key telephone set comprises:

an input/output interface portion for interfacing a transmission signal and a receiving signal between said key telephone set and said private branch exchange;

a telephone circuit for at least amplifying and side-tone processing the transmission signal and the receiving signal;

a microphone and a loud speaker for performing a communication by transmitting the transmission signal and the receiving signal; and a key board for at least inputting telephone numbers.

4. A facsimile transfer system as claimed in claim 1, wherein said facsimile terminal includes an original reader portion, a printing portion, an input operation portion, a facsimile communication control device and a control portion, wherein a destination individual mail box number data of said voice mail device input through said input operation portion and the facsimile data read out by said original reader portion are transmitted to said voice mail device through said pay station telephone network and said private branch exchange under communication control of said facsimile communication control device.

5. A facsimile transfer system as claimed in claim 1, wherein said private branch exchange comprises:

office circuits connected to said pay station telephone network;

extension circuits connected to said voice mail device and said facsimile mail device, respectively;

a switch circuit for switching communication lines between said office circuits and said extension circuits; and a control portion for controlling communication line connection between said voice mail device and said facsimile mail device through said extension circuits when a transfer information is taken in after the facsimile data is received by said voice mail device.

6. A facsimile transfer system as claimed in claim 1, wherein said facsimile mail device comprises a printing portion, an input operation portion, a facsimile data storage portion, a facsimile communication control device, a connection portion for interfacing between said facsimile mail device and said electronic mail device and a control portion for controlling said facsimile transfer system such that a facsimile data received through said private branch exchange is sent to said printing portion under facsimile transmission control of said facsimile communication control device and, when a received data is not a facsimile data, a facsimile data transferred from said voice mail device through said private branch exchange is sent to said electronic mail device through said connection portion.

7. A facsimile transfer system as claimed in claim 6, wherein the facsimile transmission procedures are binary transmission control procedures.

8. A facsimile transfer system as claimed in claim 1, wherein said voice mail device comprises:

a circuit interface portion for interfacing an input/output signal between said voice mail device and said private branch exchange;

an aural response,control portion for controlling an aural guidance response;

a communication transfer control portion for transferring a data received from said facsimile terminal through said private branch exchange;

a memory portion for storing a transfer control information to said facsimile mail device;

a hard disk for storing a voice mail data; and an aural guidance data memory portion for preliminarily storing an aural guidance data for response controlled by said aural response control portion.

9. A facsimile transfer system as claimed in claim 8, wherein said memory portion comprises a facsimile transfer control data table containing a mail box number/individual identification number portion and a facsimile mail transfer command portion.

10. A facsimile transfer system as claimed in claim 9, wherein the transfer control information set in said mail box number/individual identification number portion and said facsimile mail transfer command portion is a DTMF data including numerals and symbols used in a push button system.

11. A facsimile transfer system as claimed in claim 1, wherein said electronic mail device is a general purpose compact computer including a personal computer.

12. A facsimile transfer system as claimed in claim 1, wherein a transmission procedure of a facsimile data from said facsimile mail device on said local area network is the Internet facsimile transmission procedure.

13. A facsimile transfer system as claimed in claim 1, wherein a facsimile data received through said facsimile mail device and said private branch exchange is transferred to said electronic mail device on said local area network on the basis of the information stored in the instructed mail box number.

14. A facsimile transfer system as claimed in claim 13, wherein a transmission procedure of a facsimile data from said facsimile mail device on said local area network is the Internet facsimile transmission procedure.

15. A facsimile transfer system comprising a private branch exchange connected to a pay station telephone network, a voice mail device connected to said private branch exchange and a facsimile mail device connected to said private branch exchange and an electronic mail device, wherein a facsimile data transmitted from a facsimile terminal connected to said pay station telephone network and received by said private branch exchange is automatically transferred between said voice mail device, said facsimile mail device and said electronic mail device, wherein said voice mail device comprises:

a circuit interface portion for interfacing an input/output signal between said voice mail device and said private branch exchange;

an aural response control portion for controlling an aural guidance response;

a communication transfer control portion for transferring a data received from said facsimile terminal through said private branch exchange;

a memory portion for storing a transfer control information to said facsimile mail device;

a hard disk for storing a voice mail data; and an aural guidance data memory portion for preliminarily storing an aural guidance data for response controlled by said aural response control portion, and wherein said circuit interface portion and said aural response control portion of said voice mail device measure a constant time after reception of data from said facsimile terminal through said pay station telephone network and said private branch exchange, receives a destination individual mail box number within the constant time and perform a transfer control of the facsimile data only when a call tone signal is detected within a constant time after the constant time.

* * * * *